G. A. SOEHNLEIN.
ELECTRIC HAND LAMP.
APPLICATION FILED MAY 20, 1914.
1,171,002.
Patented Feb. 8, 1916.
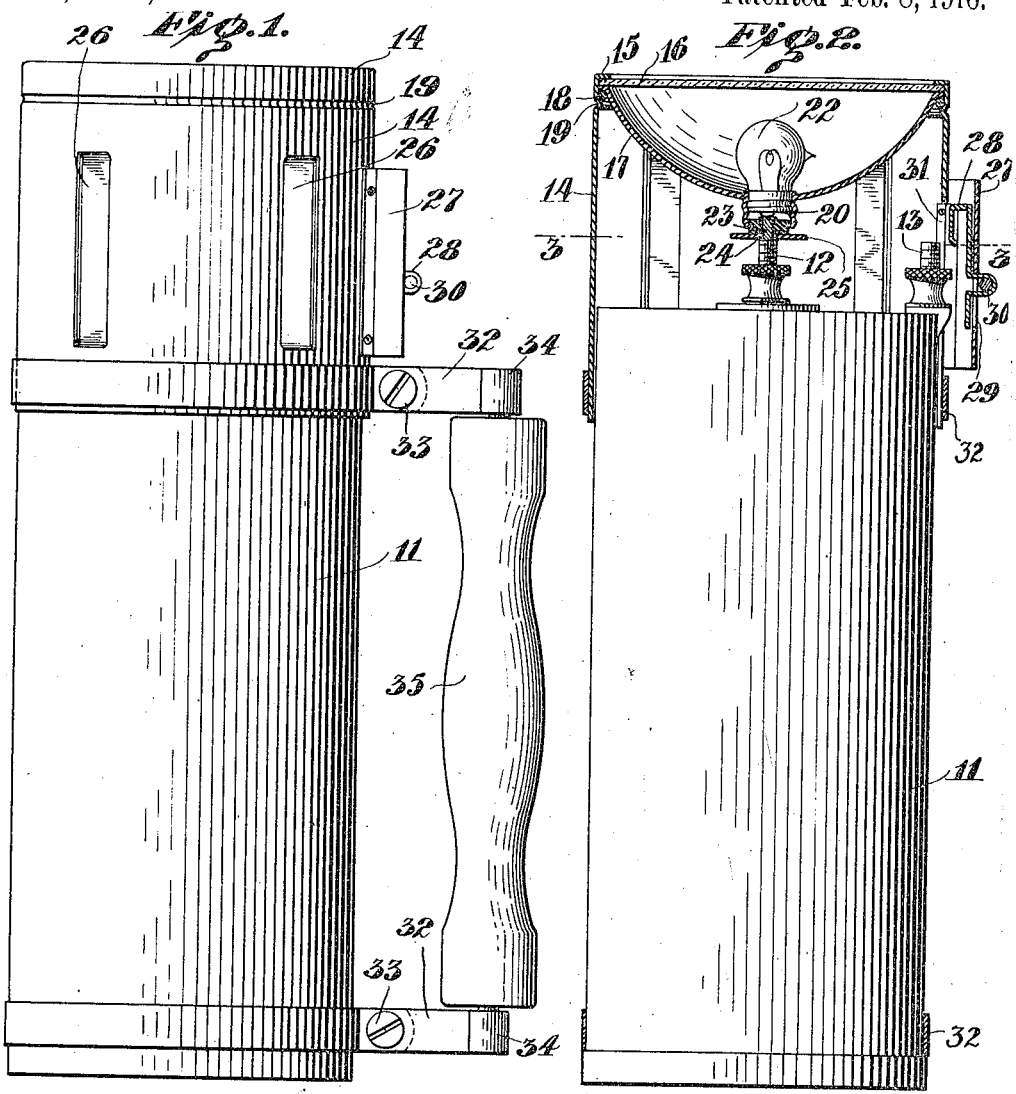
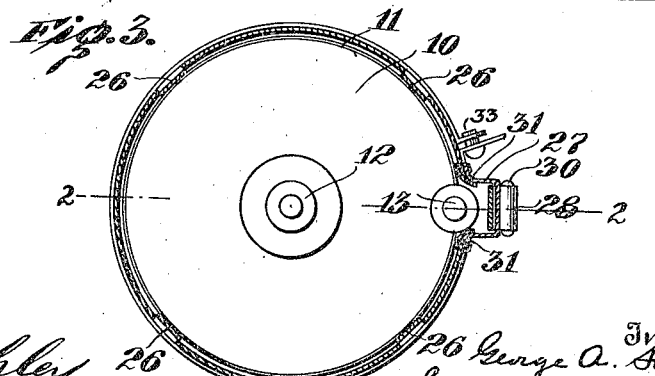
Witnesses:
C. S. Ashley
Louise M. Bruns
Inventor
George A. Soehnlein
By his Attorney
George F. Scull

UNITED STATES PATENT OFFICE.

GEORGE A. SOEHNLEIN, OF BROOKLYN, NEW YORK.

ELECTRIC HAND-LAMP.

1,171,002.　　　　　Specification of Letters Patent.　　Patented Feb. 8, 1916.

Application filed May 20, 1914. Serial No. 839,853.

*To all whom it may concern:*

Be it known that I, GEORGE A. SOEHNLEIN, a citizen of the United States, and a resident of Brooklyn, county of Kings, State of New York, have invented certain new and useful Improvements in Electric Hand-Lamps, of which the following is a specification.

This invention relates to constructions by which an incandescent lamp may be supported so as to have current supplied to it from a dry cell or other similar form of electric battery.

One of the objects of this invention is to provide a suitable mounting for an incandescent lamp, which can be readily attached to a dry cell, and as readily detached from the same, so that a new cell can be substituted for an old and exhausted cell, this mounting being arranged preferably so that the battery or cell itself becomes part of the completed combination which can be conveniently carried around by hand, as is usual with such devices.

With these and other objects in view, my invention consists of certain novel features of construction, combination and arrangement of parts as will be more fully described and pointed out in the appended claims.

In the drawing, Figure 1 represents a vertical side elevation of one form of my complete electric lamp, which in this case, is illustrated as being provided with a handle; Fig. 2 represents a section through the electric light mounting on the line 2—2 of Fig. 3, the dry cell or battery used for purposes of illustration not being shown in section; and Fig. 3 represents a section on the line 3—3 of Fig. 2.

The corresponding parts are referred to both in the drawings and specification by similar reference characters.

In the drawing, 10 represents an ordinary form of dry cell or battery cylindrical in shape, and provided with an insulation, usually cardboard 11, for the exterior of the same.

12 and 13 are the pole pieces of the battery, one of which, in the form of battery used for purposes of illustration, is approximately at the center of the cell, and the other of which has a center approximately at the edge of the periphery at the top of the cell, a portion of this latter pole piece projecting beyond the periphery.

14 is a metal shell arranged to fit down over the insulation 11 of the battery, so as to be held frictionally thereon. This frictional attachment may be obtained either by making the shell 14 of such a diameter as will enable it to just slip over the insulation 11 or in order to provide the easy attachment of the shell 14 to the insulation 11, the shell 14 may be made slightly larger than the insulation 11 and tongues 26 provided in the shell which act in the nature of springs to provide the frictional hold. It will be understood that 14 will have the same shape in cross-section as the particular form of battery 10, with which it is to be used. The upper portion of the shell 14 is turned in, as shown at 15, and a glass, either plain or lenticular, is held thereagainst by a reflector 17 and a wire 18 sprung into the shell 14 behind the inwardly extending rib 19. The reflector or support 17 is provided with a lamp socket 20 in which may be screwed the lamp 22. The specific method of supporting the lamp, just described, is well-known in the art. In the lower portion of the socket 20 is provided a plug of insulating material 23 through which extends a metallic conducting rivet 24 which fastens a conducting plate 25 to the plug 23.

It will be understood that the lamp 22 is constructed in such a way that one of its terminals, when the lamp is screwed into the socket 20, will contact with the rivet 24, the other terminal of the lamp being connected so that current will pass to it through the socket 20.

In order to permit the shell 14 to be inserted over the insulation 11 past the projecting pole piece 1ª I provide a slot in the side of the shell 14, as indicated in Fig. 3, and preferably I provide at this slot a switch adapted to be operated by the thumb of the user of the lamp and arranged so that when the shell 14 is slipped over the battery 10, the switch will be in correct position in relation to the pole piece 13. As one convenient form for this switch I have illustrated a housing 27 riveted or otherwise connected to the shell 14 over the slot in the side thereof. In order to prevent the pole piece 13 from contacting with the shell 14 I provide insulation at either side of this slot, and in the form illustrated, this insulation, as is shown at 31, consists of a flat piece of insulating material held to the shell 14 by rivets which also attach the housing 27 to the shell 14. Mounted in the slot 29 of the housing 27 is a switch member 28 bent, as shown, to form a loop outside of the housing 27 and through this loop I provide a pin 30 to keep the switch member 28 in position. As will be seen by an inspection of Fig. 2, when the loop of the switch outside of the housing 27 is pushed downward, the switch member will contact with the pole piece 13 or rather with the nut shown in place thereon. This serves to form a connection between one pole of the battery and the shell 14, and through such shell and the reflector or support 17 with one terminal of the lamp 22. The shell 14 is constructed in such a manner that when it is forced down to the position shown in Fig. 2, the conducting plate 25 will contact with the top of the pole 12. The form of conducting member which I have illustrated is so arranged as to cover any possible out-of-center position of the pole piece 12, it being obvious that 12 could be a considerable distance from the center of the battery 10 and still contact with the flange or plate 25.

From the construction so far described, it will be seen that in order to set the lamp up for operation, the shell 14 is first pushed down over the insulation 11 of the battery 10 until the contracting flange 25 rests on top of the pole piece 12. By reason of the slot in the shell 14 adjacent to the switch 28 it will be seen that the shell can be placed in position only when the switch is in correct relation to the pole piece 13. Now with the shell 14 in correct position, when the switch 28 is moved downward, it will contact with the pole piece 13, and thus complete the circuit between the terminals of the lamp and the poles of the battery. When the battery 10 is exhausted, a new battery can be readily substituted therefor as will be obvious.

In order to provide a convenient method by which the lamp can be carried, and at the same time, providing an additional means which may be used, if required, to increase the frictional hold of the shell 14 on the battery 10 and insulation 11, I provide a handle which can be readily attached to the battery 10, and the supports for which are preferably so constructed that one of them can be made to extend around the shell 14 and be clamped thereto in such a way as to increase the pressure between the shell 14 and the insulation 11. To this end I provide two metallic straps 32 at the top and bottom of the cell 10, these straps being provided with ears, as shown particularly in Fig. 3. Through these ears extends any form of clamping device such as a screw having a wing nut or other suitable tightening means. One of these wings is extended to provide an eye 34 through which the pin of the handle 35 is placed. When using the upper strap 32 as a clamping means for the shell 14, it will be understood that after the shell 14 is in place, the strap 32 is moved upward and around the same and then tightened by means of the screw 33 to produce the required increased frictional hold.

Having now described my invention, I claim:

1. A battery cell having its pole pieces projecting from the top thereof and one of said pole pieces projecting beyond the periphery of said top, an insulation on the exterior of said cell, a case arranged to fit over the top of said cell and around said insulation, said case being provided with an opening to accommodate said projecting pole, an insulation on said case adjacent said opening, arranged to prevent electrical contact between said case and said pole, a lamp in said case, and means to form an electric circuit through said lamp and cell when said case is in position.

2. A battery cell having its pole pieces projecting from the top thereof and one of said pole pieces projecting beyond the periphery of said top, an insulation on the exterior of said cell, a case arranged to fit over the top of said cell and around said insulation, said case being provided with an opening to accommodate said projecting pole, an insulation on said case adjacent said opening, arranged to prevent electrical contact between said case and said pole, a switch on said case adjacent said pole, adapted to connect said projecting pole and said case electrically, a lamp in said case, and means, including said case and said switch, to form an electric circuit through said lamp and cell.

3. A cylindrical battery cell having its pole pieces projecting from the top thereof and one of said poles projecting beyond the periphery of said top, an insulation on the exterior of said cell, a cylindrical, metallic case arranged to fit over the top of said cell and to engage said insulation frictionally, a lamp in said case, said case being provided with a slot in its side to permit the passage of said projecting pole when said case is moved endwise into position on said cell and to locate said case in proper relation to said cell, a switch on said case, adapted to connect said projecting pole and said case electrically, insulation on said case, adjacent said opening, to prevent electrical contact between said pole and said case, and means, including said case and switch, to form an electric circuit through said lamp and cell.

4. A battery cell having its pole pieces projecting beyond the top thereof, a case adapted to fit over the top of said cell, and around the exterior thereof, insulation between said case and the exterior of said cell, a lamp in said case, means for forming an electric circuit through said cell and said case when said case is in position on said cell, and a handle removably attached to said cell and adapted to clamp said case to said cell.

5. An electric light mounting, comprising a metallic case, a lamp socket in said case, a switch on said case, said case being open at one end to permit the entrance of the top of a battery into said case, and having a slot in one side extending from said open end, said switch being located opposite said slot, and insulation along the edges of said slot.

6. A case, a metallic lamp socket in said case, an insulating plug in the bottom of said socket, a conducting member extending through said plug, a contact member connected to said conducting member and having an extended area, a battery cell in said case, said cell having a projecting pole piece arranged to contact with said conducting member.

7. A case, a metallic lamp socket in said case, an insulating plug in the bottom of said socket, a conducting member extending through said plug, a contact member connected to said conducting member and having an extended area, a battery cell in said case, said cell having a projecting pole piece arranged to contact with said conducting member, said case and said battery being constructed and arranged so that said lamp socket and said pole piece lie on opposite sides of said contact member.

GEORGE A. SOEHNLEIN.

Witnesses:
 CHARLES PECKHAM,
 DAMIAN SCHWER.